Oct. 7, 1969 D. C. UIMARI 3,471,713
HIGH-SPEED LOGIC MODULE HAVING PARALLEL INPUTS DIRECT
EMITTER FEED TO A COUPLING STAGE AND A
GROUNDED BASE OUTPUT
Filed Dec. 16, 1965
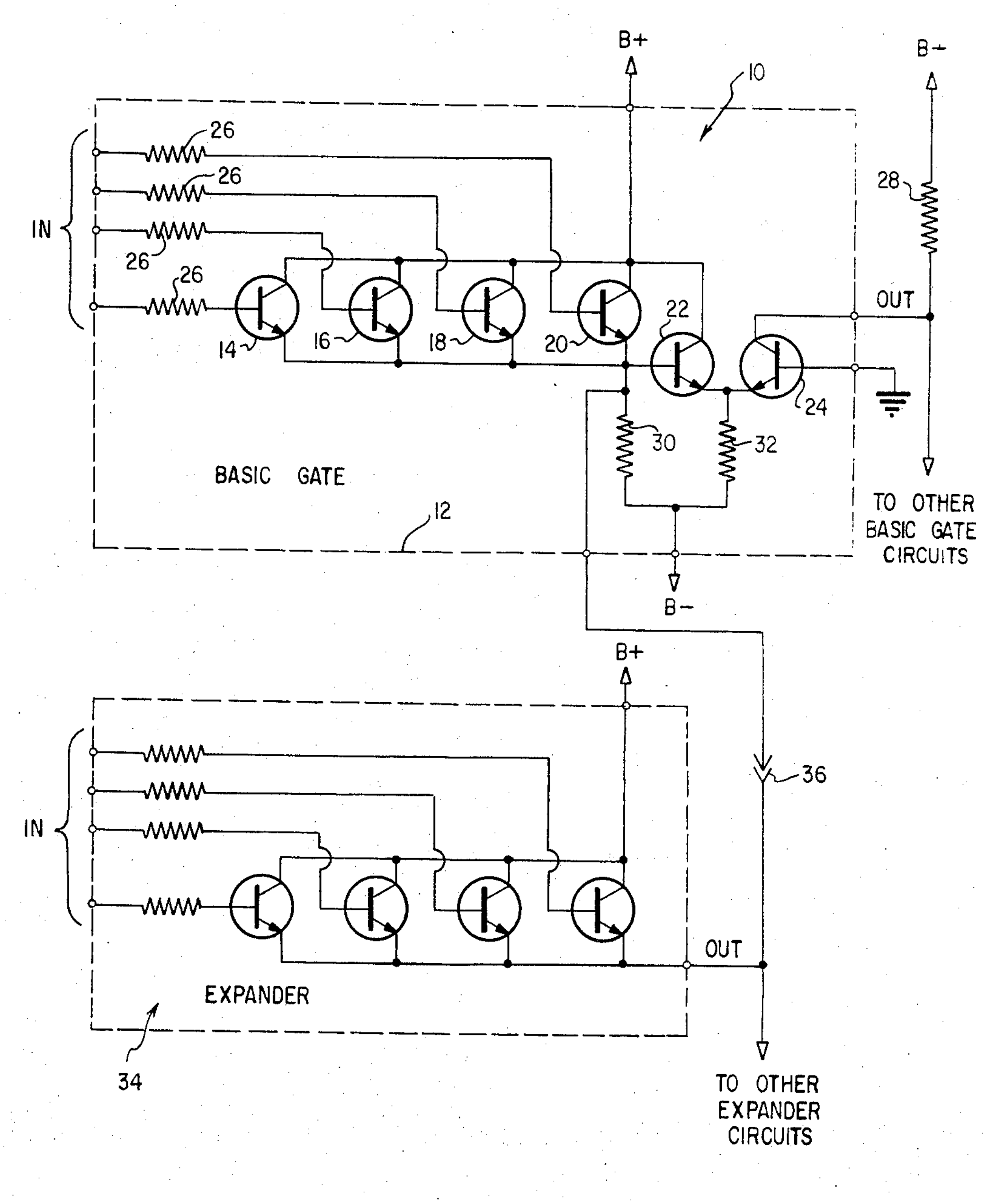
INVENTOR
DAVID C. UIMARI
BY Sughrue, Rothwell, Mion, Zinn & Macpeak
ATTORNEYS.

United States Patent Office 3,471,713

Patented Oct. 7, 1969

3,471,713

HIGH-SPEED LOGIC MODULE HAVING PARALLEL INPUTS, DIRECT EMITTER FEED TO A COUPLING STAGE AND A GROUNDED BASE OUTPUT

David C. Uimari, Raleigh, N.C., assignor to Corning Glass Works, Corning, N.Y., a corporation of New York Filed Dec. 16, 1965, Ser. No. 514,296

Int. Cl. H03k 19/22, 19/30

U.S. Cl. 307—218 4 Claims

ABSTRACT OF THE DISCLOSURE

A logic module including a plurality of parallel input transistors with common emitters connected to the base of a coupling transistor. The emitter of the latter is directly coupled to the emitter of a grounded base output transistor. The coupling transistor isolates noise signals from the output, the output transistor is either off or near saturation to obviate the need for stable supply voltages, and propagation speeds of 4 nanoseconds may be achieved.

This invention relates in general to an electronic gating circuit and more particularly to a novel, high speed logic module having sufficient flexibility to implement AND, OR or AND/OR gating functions.

The inherent high switching speeds of transistorized current mode logic circuits have resulted in their widespread use, in various forms, in computer and data processing logic systems where speed is a dominant criterion. Some of the disadvantages of the current mode logic circuits of the prior art include the required use of both NPN and PNP transistors, their relative incompatibility with other types of logic circuits and the necessity for highly stable reference voltage sources.

It is a primary object of this invention to provide an electronic gating circuit that possesses the high speed switching capability of current mode logic circuits, but which suffers from none of their drawbacks.

It is a further object of this invention to provide such a circuit which has sufficient flexibility to implement logical AND, OR or AND/OR gating functions and in which all of the transistors employed are of a like conductivity type.

It is a further object of this invention to provide such a circuit which is characterized by a low signal-to-noise ratio, which requires no reference voltage source and which has large fan-in, fan-out capabilities.

These and further objects and advantages of this invention are realized in a preferred embodiment thereof by a novel gating circuit in which the emitter outputs from a plurality of parallel connected input transistors are fed to the base terminal of an intermediate or coupling stage transistor. The emitter output of the latter is directly connected to the emitter of a grounded base saturable output transistor in a current mode configuration, and the circuit output is taken from the collector of the output transistor. With this type of arrangement, the output transistor is normally conducting and the coupling transistor is cut off. When the base of any one or more of the input transistors is raised, thus increasing the base voltage of the coupling transistor, the latter is rendered conductive which in turn cuts off the output transistor. This raises the collector potential of the latter to the level of the supply voltage. This basic logic gate module may easily be expanded in either a fan-in or a fan-out manner to both increase the number of inputs and vary the logic functions performed.

For a more complete understanding of the principles of this invention, reference is made to the following more detailed description of a preferred embodiment thereof taken in conjunction with the drawing, in which the single figure shows a schematic circuit diagram of the invention.

The basic gate module 10, which may be formed on a single printed circuit board indicated by the broken line 12, includes a plurality of input transistors 14, 16, 18 and 20, an intermediate or coupling transistor 22 and an output transistor 24. In the circuit shown, all of the transistors are of the NPN type, although PNP transistors could be employed with equal facility by merely reversing the operating polarities. The input signals are applied to the base terminal of the input transistors through current limiting resistors 26 and the output signal is taken from the collector terminal of transistor 24 across a load resistor 28. The emitter outputs from the four input transistors are fed to the base of the coupling transistor 22 whose emitter is tied directly to the emitter of the output transistor 24 in a current mode configuration. The emitters of all of the transistors are connected to the B— supply as shown through biasing resistors 30 and 32 while the collectors of all but the output transistor are connected directly to the B+ supply.

In operation, the bases of the four input transistors are initially at zero volts. Their emitter voltages, and therefore the base of transistor 22, are slightly negative due to the base-emitter drop of the input transistors. Since the base of the output transistor 24 is connetced to ground, it also conducts and establishes a negative voltage at its emitted (and therefore the emitter of transistor 22) which is also slightly below ground. Since the base and emitter voltage of transistor 22 are approximately equal, it cannot conduct. In this condition, the parameters of resistors 28 and 32 are chosen so that when transistor 24 is turned on and 22 is turned off, the collector potential, and therefore the output level, is approximately zero volts.

Assuming now that a positive input signal is applied to the base of transistor 14, for example, the emitter voltages is immediately raised from its negative level to a level slightly below B+. This increased potential is also seen at the base of the coupling transistor 22, and since the emitter of the latter is negative, transistor 22 is turned on. A greatly increased current is now drawn through the biasing resistor 32 and the correspondingly increased voltage drop across the resistor raises the emitter potential of transistors 22 and 24 to the point where the latter becomes cut off. With transistor 24 nonconductive, its collector potential, from which the gate output is taken, rises from ground to the B+ level, thus indicating that at least one of the inputs is satisfied.

In the gating circuit just described, a propagation speed of approximately 4 nanoseconds is achieved through the use of a current mode configuration for the coupling and output transistors. The coupling transistor also serves to isolate any spurious noise signals which may be present at the input terminals. The signal-to-noise ratio is further enhanced by reason of the output transistor being either referenced to ground or cut off. In addition, allowing the output transistor to approach saturation avoids the necessity for a stable reference voltage source and renders the circuit compatible with other logic gate circuits.

As shown in the drawing, the input capabilities of the circuit may be increased in a fan-in manner by simply adding on expansion units, such as the gate expander 34. The latter will be recognized as having a configuration identical to that of transistors 14, 16, 18 and 20 in the basic gate 10, and its emitter output is fed through the connector 36 to the base of the coupling transistor 22 in the same manner as the other input transistors.

If a logical 1 is defined as a positive potential and logical 0 as ground. then the basic gate, as well as any connected expansion units, operates as an OR gate, since the satisfaction of any one of the inputs raises the output. On the other hand, if the logical 1 is defined as ground and a logical 0 as a positive potential, then an AND function is realized since all of the inputs must be satisfied (supplied with 0 volt signals) to produce a like output. An AND/OR function may be implemented by connecting the outputs from a plurality of basic gate modules to the same load resistor in a fan-out manner, as indicated by the arrow in the drawing. With such a configuration, if all of the inputs are satisfied for any one of the modules, the output transistor for that module will be saturated and the overall output potential will drop to approximately 0.

While the invention has been particularly shown and described with reference to a preferred embodiment thereof, it will be understood by those skilled in the art that various changes in form and details may be made therein without departing from the spirit and scope of the invention.

What is claimed is:

1. An electronic logic gate circuit, comprising: at least three input transistors whose emitter-collector paths are connected in parallel and whose bases may be selectively supplied with input signals, a coupling transistor having its base directly connected to the emitters of the input transistors, an output transistor having a grounded base, means directly connecting the emitters of the coupling and output transistors, means for deriving an output signal from the collector of the output transistor, and means supplying operating potentials of the proper polarities to the emitters and collectors of all of the transistors, whereby the output transistor is conducting in the absence of any input signals and the coupling transistor is nonconductive and wherein the application of one or more input signals renders the coupling transistor conductive which in turn cuts off the output transistor.

2. An electronic logic gate circuit as defined in claim 1 wherein all of the transistors are of the same conductivity type.

3. An electronic logic gate circuit as defined in claim 1 further comprising: a second plurality of input transistors whose emitter-collector paths are connected in parallel and whose bases may be selectively supplied with input signals, and means for connecting the emitters of the second plurality of transistors to the base of the coupling transistor.

4. An electronic logic gate circuit as defined in claim 1 further comprising means for connecting the outputs of additional logic gate circuits of the type defined in claim 1 to the collector of the output transistor.

References Cited

UNITED STATES PATENTS

| | | | |
|---|---|---|---|
| 2,964,652 | 12/1960 | Yourke | 307—216 |
| 3,016,466 | 1/1962 | Richards | 307—207 |
| 3,283,180 | 11/1966 | Pressman | 307—215 |
| 3,292,012 | 12/1966 | Cook | 307—213 |
| 3,381,232 | 4/1968 | Hoernes et al. | 307—207 X |

DONALD D. FORRER, Primary Examiner

U.S. Cl. X.R.

307—203

PO-1050
(5/69)

UNITED STATES PATENT OFFICE
CERTIFICATE OF CORRECTION

Patent No. 3,471,713 Dated October 7, 1969

Inventor(s) David C. Uimari

It is certified that error appears in the above-identified patent and that said Letters Patent are hereby corrected as shown below:

Column 2, line 30, "emitted" should read ''emitter''.
Column 2, line 39, "voltages" should read ''voltage''.

SIGNED AND
SEALED
DEC 23 1969
Dec 23, 1969

(SEAL)
Attest:

Edward M. Fletcher, Jr.
Attesting Officer

WILLIAM E. SCHUYLER, JR.
Commissioner of Patents